Figure 1:
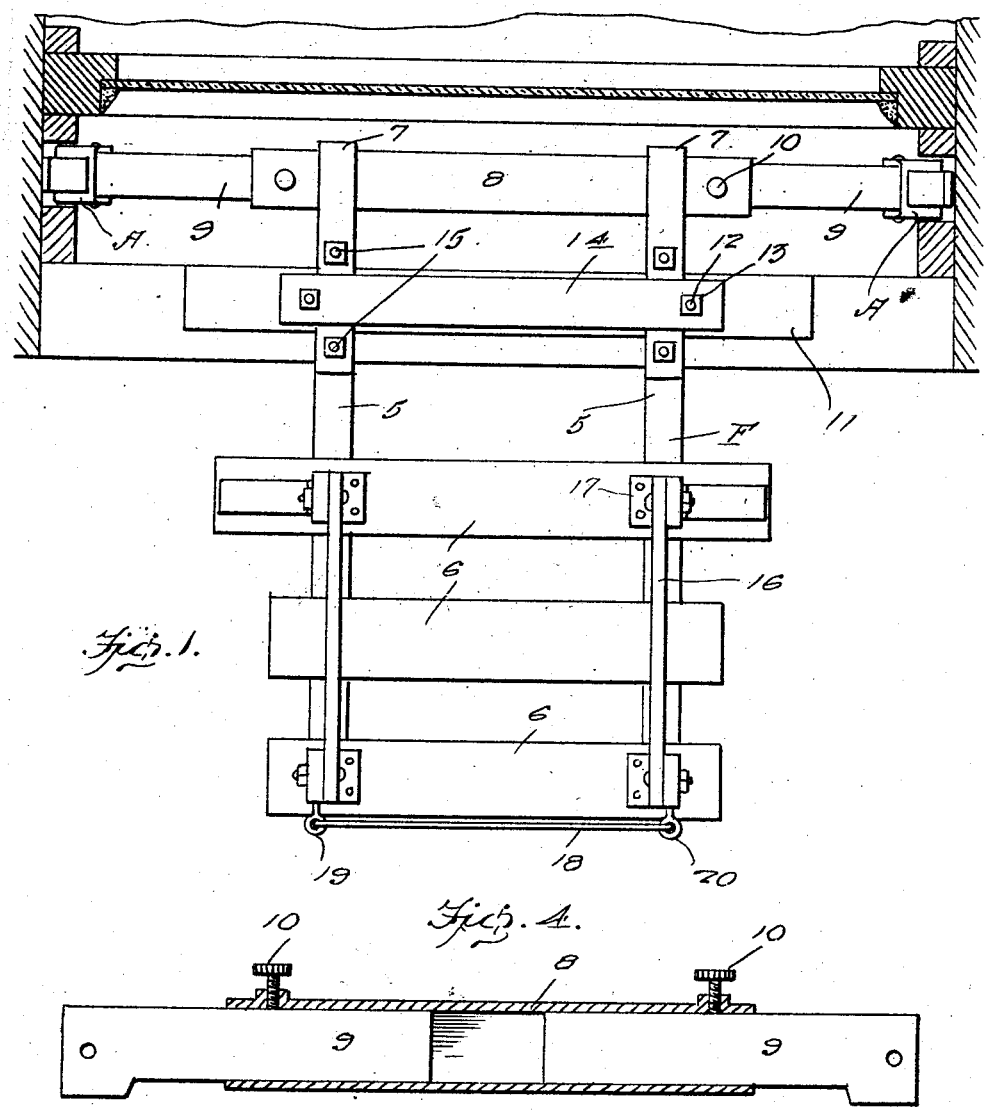

Dec. 7, 1926.

A. MONTEI

WINDOW WASHING RACK

Filed May 11, 1926    2 Sheets-Sheet 2

1,609,657

Inventor
A. Montei
By Clarence A. O'Brien
Attorney

Patented Dec. 7, 1926.

1,609,657

UNITED STATES PATENT OFFICE.

AUGUST MONTEI, OF MALCOM, IOWA.

WINDOW-WASHING RACK.

Application filed May 11, 1926. Serial No. 108,394.

The present invention relates to a window washing rack and has for its principal object to provide a structure which allows a workman to wash windows in perfect safety.

Another important object of the invention lies in the provision of a device of this nature which is adjustable for fitting different sized window frames.

Another very important object of the invention lies in the providing of a device of this nature which is capable of being quickly and easily engaged in a window frame in a secure manner.

A still further very important object of the invention lies in the provision of a rack of this nature which is exceedingly simple in its construction, strong and durable, efficient and reliable in use, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
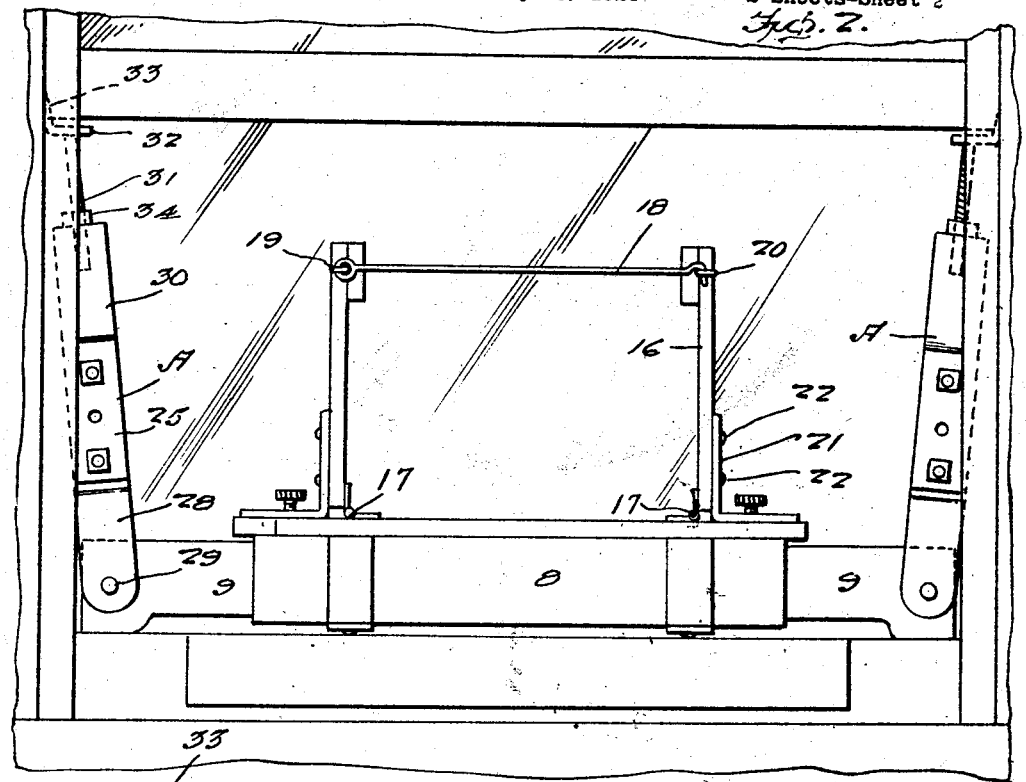
Figure 3:
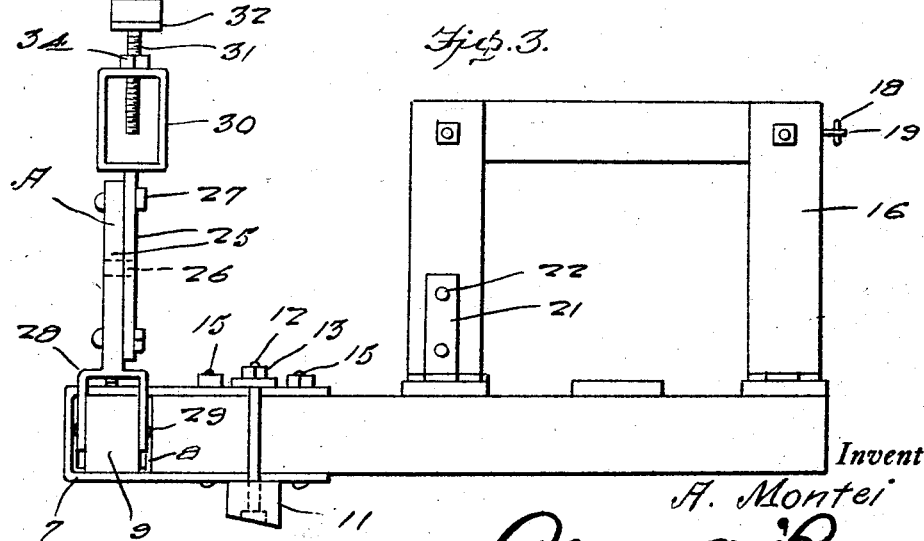

Figure 1 is a top plan view of the window cleaning rack embodying the features of my invention, showing the window frame in transverse horizontal section, Fig. 2 is an end elevation thereof, Fig. 3 is a side elevation of the rack, Fig. 4 is a detail sectional view through the adjusting feature, and Fig. 5 is a detail perspective view of one of the chocks and its shank.

Referring to the drawing in detail, it will be seen that the letter F designates generally a frame including a pair of beams 5 disposed in spaced parallelism and connected by cross plates 6 adjacent one end. Straps 7 are mounted at the other ends of the beams 5 and hold a square tubular member 8 in which is slidable a pair of bars 9 which may be held in different adjusted positions by means of set screws 10.

A sill engaging bar 11 extends transversely under the beams 5 being held in place by bolts 12 and nuts 13 engaging plate 14, extending across the tops of the beams 5. It will be noted that the straps 7 are held in place by bolts 15, a pair of which are engaged with each beam 5. The plate 14 and the bar 11 extend between the bolts 15. These bolts 15, therefore, limit the longitudinal movement of the bar 11 and plate 14 on the beams 5.

A pair of sides 16 are provided on the frame, one above each beam 5 being hinged to the plates 6 as at 17, these sides are held in upright positions by a hook 18 pivoted on an eye bolt 19 on one side and engaging an eye bolt 20 on the other side as is illustrated clearly in Figs. 1 and 2. L-shaped braces 21 have one arm fixed to the sides at 22, while the other arms are abuttable with one of the plates 6 when the sides are in a vertical position and assist in preventing them from swinging outwardly, thus enhancing the strength and safety of these sides.

A pair of arms A are pivoted on the outer extremities of the bars 9. Each arm A includes a pair of shanks 25, each of which is provided with a plurality of apertures 26 for receiving bolts 27 so that the shanks may be held securely together in different adjusted positions for the lengthening or shortening of the arms as may be desired. One of the shanks 25 has at its bottom end a yoke 28 straddling the extremity of the adjacent bar 9 and pivoted thereto as at 29. The upper end of the other shank 25 terminates in a rectangular frame 30, the upper end of which is pierced by a threaded shank 31 having an L-shaped chock 32 thereon provided with an upper feather edge 33 for engaging between the window sash and the window frame, as is clearly indicated in dotted lines in Fig. 2.

The shank 31 of the chock 32 is adjustable in relation to the frame 30 by means of a nut 34. From the above detailed description, it will be seen that I have provided a window washing rack that may be constructed very sturdy and yet comparatively light so as to be capable of easy handling. The device is thoroughly adjustable so as to fit a large number of different sized window frames. The device allows a workman to operate in perfect safety thereon and also gives him the desirable freedom necessary in efficiently washing windows.

It is thought that the construction, utility, and advantages of this invention will now be clearly understood by those skilled in this art without a more detailed description thereof. The present embodiment of the invention has been disclosed in detail merely by way of example, since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed, or sacrificing any of its advantages.

Having thus described my invention, what I claim as new is:—

1. A device of the class described including, in combination, a frame, a tubular member extending transversely at one end of the frame, a pair of bars slidably mounted in the ends of said tubular member, a pair of adjustable arms pivotally mounted on the ends of the bars, and adjustable chocks on the extremities of said arms.

2. A device of the class described including in combination, a frame, a tubular member mounted transversely at one end of the frame, a pair of bars slidably mounted in the tubular member, means for holding said bars in different adjusted positions, a pair of arms pivotally mounted on the extremities of said bars, each arm including a pair of sections having shanks provided with a plurality of registrable openings, bolts for said openings to hold said shanks in different adjusted positions in relation to each other, one shank of each arm terminating in a yoke straddling the end of the adjacent bar, and pivoted thereto, and the upper extremity of the other shank terminating in a rectangular portion having an opening, a threaded shank in the opening of each rectangular portion, and a chock on the end of said threaded shank.

In testimony whereof I affix my signature.

AUGUST MONTEI.